United States Patent [19]
Thomas et al.

[11] 3,809,897
[45] May 7, 1974

[54] SAMPLE CHANGING AND LIGHT SEALING DEVICE FOR LIQUID SCINTILLATION SPECTROMETER

[75] Inventors: Edward W. Thomas, Rockaway; Walter Oscar Scherzer, Andover, both of N.J.; Fernand Sicard, Saint-Etienne, France

[73] Assignee: Intertechnique S. A., Plaisir, France

[22] Filed: Mar. 26, 1968

[21] Appl. No.: 716,213

[30] Foreign Application Priority Data
Mar. 27, 1967 France .................... 67.100706

[52] U.S. Cl. .......................... 250/288, 250/71.5 R
[51] Int. Cl. .................................... G01t 1/20
[58] Field of Search ......... 250/106 SC, 71.5; 74/25, 74/49, 89.2

[56] References Cited
UNITED STATES PATENTS
3,663,816  5/1972  Scherzer et al. ............... 250/106 SC
3,626,190  12/1971  Cannon ........................ 250/106 SC
828,624  8/1906  McIntire .............................. 74/49
2,885,557  5/1959  Kizaur ........................ 250/106 SC X
3,163,756  12/1964  Meeder et al. ............. 250/106 SC X

*Primary Examiner*—Walter Stolwein
*Assistant Examiner*—Davis L. Willis
*Attorney, Agent, or Firm*—Cameron, Kerkam and Sutton

[57] ABSTRACT

The sample changer is for automatically moving samples from a conveyor into a counting chamber and back to the conveyor and for preventing access of light to the counting chamber. It comprises two shutter assemblies so controlled that they alternately open. One of them comprises a plunger carrying the sample to be moved and which, when lowered, successively clears the way for the other shutter assembly to close and forces down the movable component of an abutment type light seal against the return action of a spring.

13 Claims, 5 Drawing Figures

SAMPLE CHANGING AND LIGHT SEALING DEVICE FOR LIQUID SCINTILLATION SPECTROMETER

The present invention relates to changers which are adapted to automatically transfer a sample from a first location where it is moved and stopped by a conveyor to a second location, to retain the sample in said second location for a certain time, to bring back the sample to the first location, and to repeat the same sequence of operations on a plurality of samples as they are successively carried to said first location by the conveyor. Such a sample changer finds an important but not exclusive application in the field of liquid scintillation spectrometry: in scintillation spectrometers the second location is provided in a counting chamber and adjacent to photomultipliers which should be protected against light from the outside atmosphere in order that they provide a measure corresponding to the scintillations in the sample only.

In order that such sample changers are adapted for correct operation in a liquid scintillation spectrometer, they must correspond to stringent specifications. A great number of operating sequences should be guaranteed between successive maintenance operations. Since the mechanism is to operate for long time periods without any supervision it should be rugged in construction, reliable in operation and fail safe. The sample character should definitely prevent light leaks from occuring during the periods for which the samples are counted even after normal wear and be substantially free of malfunctions which would result in the photomultipliers being permanently subjected to such light while their electric supply is on, since light entrance would result in errors on the measured activities of the samples and, if permanent, may damage the phototubes.

Most automatic sample changers presently used in liquid scintillation spectrometers include two alternately closed successive optical closure devices which are opened and closed in succession so that the counting chamber is permanently sealed from the outside. In a typical prior art device, protection against outside light was provided by (i) a shutter plate located under the conveyor and movable transversally to the path of the samples between the conveyor and the light tight counting chamber and (ii) a plunger adapted for reciprocating movement, in a vertical bore of a stationary part, the lower portion of the bore constituting the counting chamber. Sliding rings carried by the plunger cooperate with the bore wall for sealing the chamber. The shutter plate and the plunger are driven by a common reversible motor.

This prior art arrangement has several drawbacks: the sliding seals have a high rate of wear and should be frequently replaced if objectionable light leaks are to be avoided. If a sample jams in the bore while it is moved from the conveyor to the counting chamber, the shutter plate may strike the sample. The transmission linkage between the shutter plate and reversible motor must include a clutch or another torque limiting device for removing the risk of damaging the shutter plate or of crushing the sample vial.

The elevator mechanism in prior art equipment consisting, in part, of a solid plunger has caused the device to have an overall vertical dimension approximating twice the distance of the vertical travel of the sample container. This has resulted in excessively large housing being required for such mechanism.

It is an object of the present invention to provide an automatic sample changer in which light-tightness of the counting chamber remains satisfactory even after partial wear of the joints.

It is another object of the invention to provide an automatic sample changer including simple and rugged mechanical arrangements and however providing complete safety in case of jamming.

Still another object of this invention is to provide a more compact mechanism thus permitting a smaller enclosure with related gains in cost and in reduced space.

It is an overall object of the invention to provide an automatic sample changer, particularly for liquid scintillation spectrometers, which is substantially free of the shortcomings of the prior art devices.

Other objects and advantages of the invention will appear from the following description of one embodiment of the invention given as a non limitative example. The description refers to the accompanying drawings, wherein:

FIG. 1 is a view in vertical section of an automatic sample changer embodying the invention and of the associated components of a liquid scintillation counter, with the parts being shown in the positions they assume when a sample is in the conveyor (rest condition);

FIG. 2, similar to FIG. 1, illustrates the parts in the positions they assume when the sample is in the counting chamber (working condition);

Figure 1:
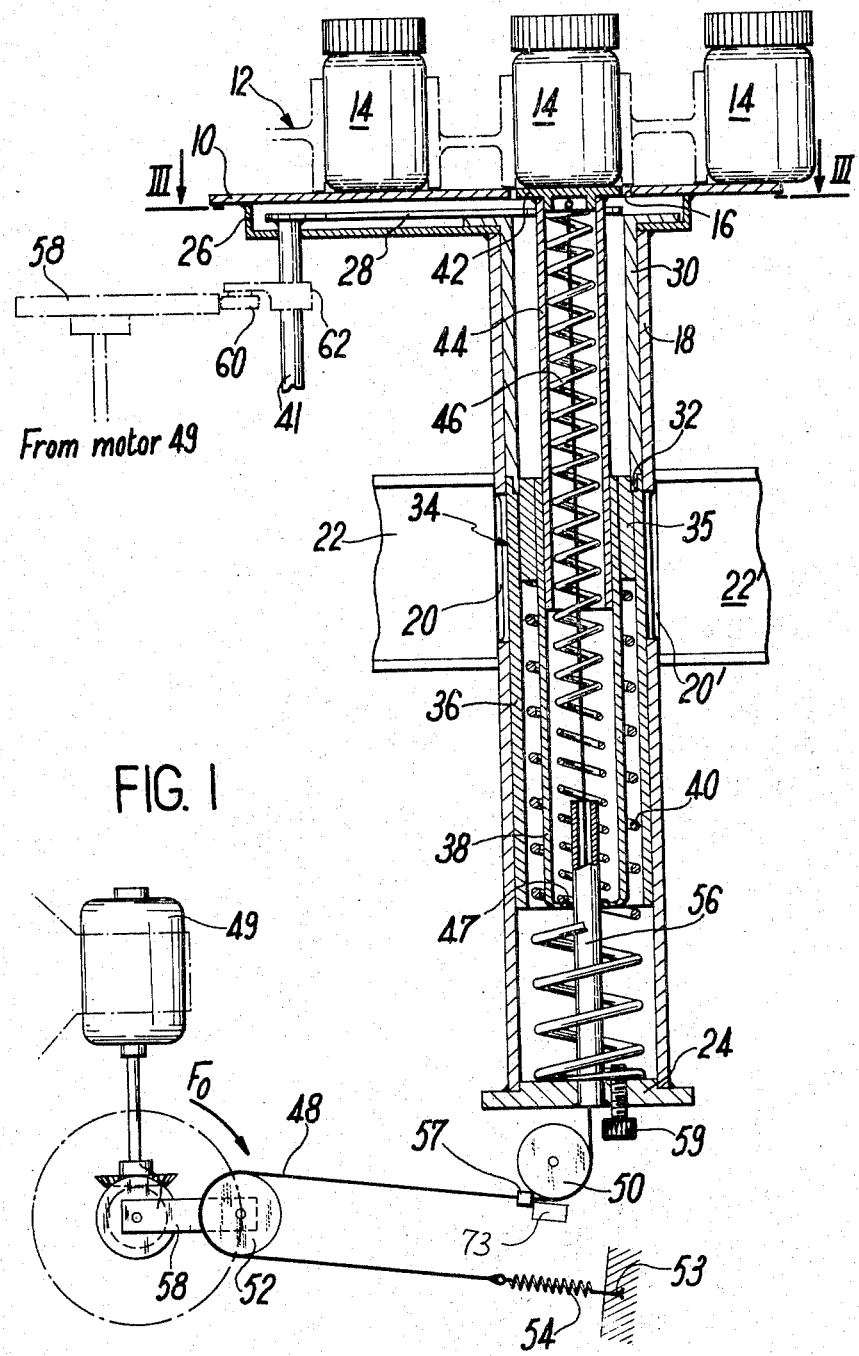
Figure 2:
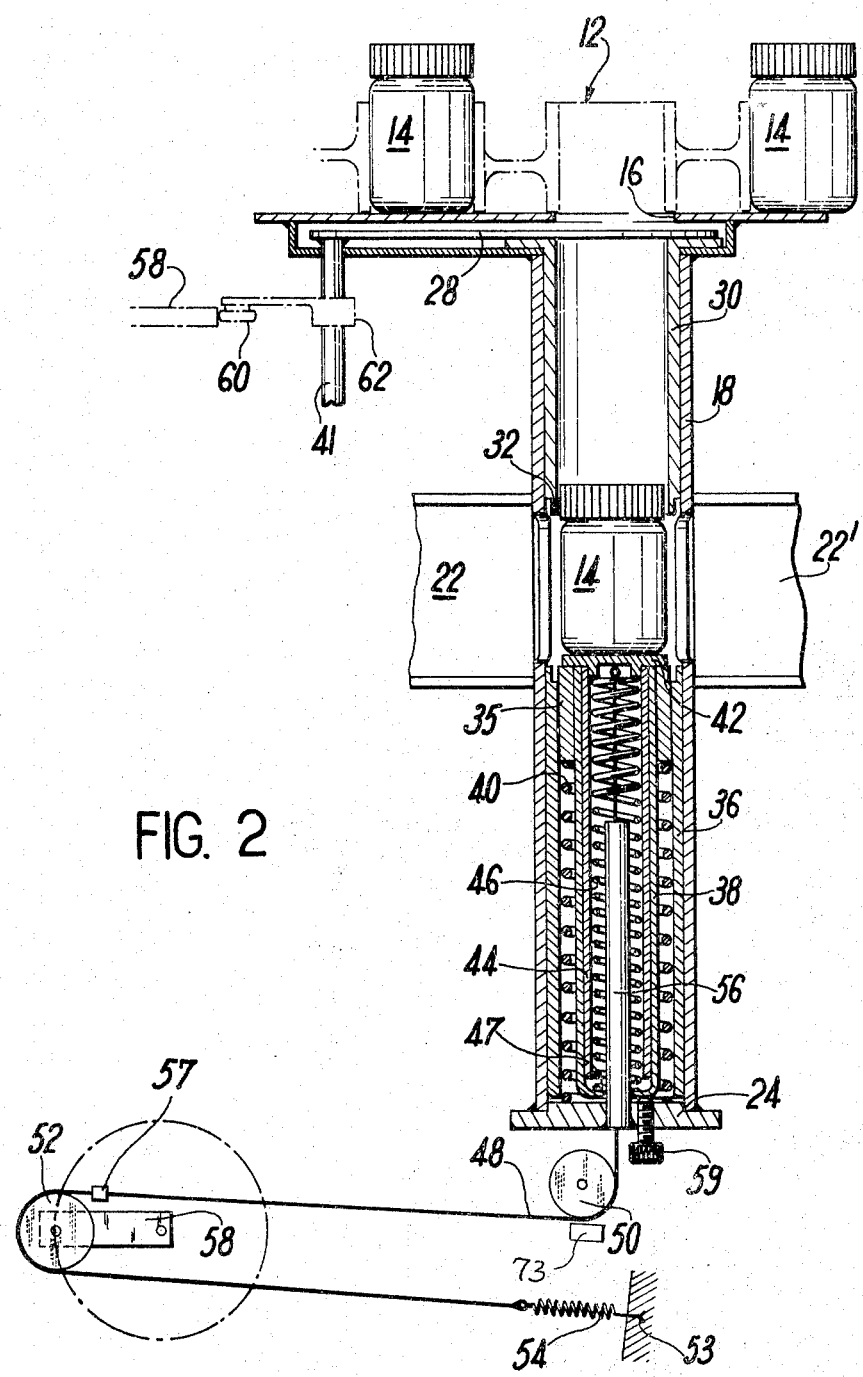

Referring first to FIGS. 1 and 2, there is schematically shown a sample changer which is carried by a stationary frame (not shown). A horizontal table 10 secured to the frame supports samples 14 received in successive links of a conveyor 12. The conveyor 12 may preferably be of the type described in French patent application n°100 705 in the name of the assignee of the present invention although other types such as a rotatable and indexable disk plate may be used. The conveyor 12 is associated with a driving mechanism adapted to move the links along a closed path and to stop each of a plurality of samples 14 successively above a hole 16 in the table 10. The size of the hole is sufficient for the samples to pass through it. Each sample 14 consists of a solution containing a product carrying traces of radioactive isotopes to be measured (such as H3, C14, P32) dissolved or suspended in the solvent together with primary and sometimes secondary scintillators such as POP and POPOP. The solution is contained in a vial made of a glass selected for being transparent to the light pulses provided by the secondary scintillator.

A vertical cylindrical casing 18 coaxial with hole 16 is secured to the frame. An intermediate portion of the vertical casing 18 is formed with two apertures 20 and 20' located at the same level and diametrically opposed. Two photomultiplier tubes 22 and 22' view into the casing through the apertures 20 and 20'. The phototubes are of conventional type and shielded by a body (not shown) of heavy material such as iron for protection against outside radiation.

Figure 3:
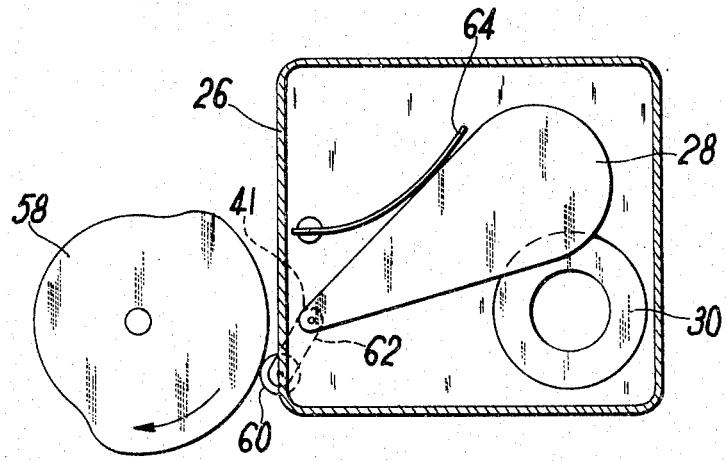
FIG. 3 is a diagrammatic view in horizontal section along time III — III of FIG. 1, showing the shutter plate constituting a portion of the light sealing device.

The lower portion of the vertical casing 18 is closed by a bottom plate 24 secured to the casing by any suitable means such as a weld. Casing 18 is securely connected to the lower surface of the table by a shallow cup 26 whose horizontal cross-section is much larger than that of the casing, as shown on FIG. 3. The cup locates a shutter plate 28 which will be more fully described later and is of relatively conventional construction. A tube 30 having a sliding fit with the upper portion of the casing 18 is permanently located in the latter and terminates just short of the upper edge of the apertures 20 and 20'. Tube 30 has an upper radially outer flange 31 which lies on the bottom plate of the shallow cup 26. The inner diameter of the tube 30 is large enough to accomodate the vials of the samples 14.

For protection of the phototubes against the ambiant light, two successive shutter assemblies which open alternately are provided and will now be described.

The first shutter assembly comprises the tube 30 and a sleeve 34 received in the lower portion of the vertical casing 18 for reciprocating sliding movement therein. The lower end of tube 30 has a tubular projection 32 of reduced thickness and the upper portion 35 of sleeve 34 is formed with a circular groove whose axial length, diameter and radial width correspond to those of the tubular projection 32: when sleeve 34 is in its upper position, the projection 32 and groove cooperate for providing a labyrinth light seal between the base of tube 30 and the apertures 20 and 20'.

The lower portion of sleeve 34 comprises two coaxial tubular parts bridged by portion 35. The external tubular part 36 is such as to have a sliding fit in casing 18. The inner tubular portion 38, of smaller diameter, limits with part 36 an annular space which locates a return spring 40 compressed between the end plate 24 of casing 18 and the thick portion 35 of sleeve 34. The spring 40 forces the sleeve upward toward the rest position in which it is illustrated in FIG. 1. In that rest position the sleeve 34 and the tube 30 provide a light-tight seal which separates the phototubes 22 and 22' from the ambiant light.

The second shutter assembly comprises the upper flange 31 of tube 30 and the shutter plate 28. Plate 28 is secured to a vertical shaft 41 guided by an opening in cup 26 and by bearings (not shown). As will be seen later, a mechanism is provided for imparting to shaft 41 and plate 28 an oscillatory movement between a rest position where the plate closes the bore of the first tube 30 and an opening position (FIGS. 1 and 3) where it clears the bore.

When a sample 14 is located co-axially with the hole 16 in table 10 and the conveyor is in rest condition (FIG. 1) the sample vial lies on a support disk 42 then located level with the table. Support disk 42 is securely fastened to a tubular piston 44 whose outer diameter is such that the piston has a sliding fit in the sleeve 34.

A spring 46 compressed between the support disk 42 and an inner flange 47 of the lower portion of the tubular piston 44 biases the piston upwardly. Spring 46 is of such stiffness that when in its completely compressed condition (that is when support disk 42 abuts sleeve 34) its compression force is still smaller than the expansion force of spring 40 which biases sleeve 34 upwardly. If this condition is fulfilled when a downwardly directed force is exerted on the support disk 42, spring 46 yields while the length of spring 40 remains unchanged (and consequently sleeve 34 remains in its rest position where it is in contact with tube 30) until the support disk 42 has travelled by the distance corresponding to abutment with the upper end surface of sleeve 34. Continued downward movements of disk 42 results in plunger 44 and sleeve 34 moving as a whole against the compression force of spring 40.

Downward movement of the support disk against the resilient forces of springs 46 and 40 is controlled by a mechanism energized by an electric motor 49. The mechanism illustrated in FIGS. 1 – 2 comprises a flexible force transmitting member, such as a metal strip 48. One end of the strip is secured to the support disk 42. The strip extends along the axis of the vertical casing 18, is directed by a deviation pulley 50 carried by an axis and engages over a driving pulley 52 on which strip 48 is guided. The other end of the strip is connected to a stationary abutment 53 by a short length spring 54. A vertical tube length 56 carried by the bottom plate 24 is preferably provided for separating the strip 48 from the springs and for cooperating with pulley 50 in guiding the strip 48.

The driving pulley 52 is carried by the end portion of a crank-shaft 58 drivably connected to the shaft of motor 49 and the axis of the pulley moves along the circular path indicated in dash-dot lines on FIG. 1 in the direction of arrow $F_o$ when the motor is energized. It is important to note that this arrangement permits using a motor which rotates in the same direction at all time while prior art devices embodied a reversible motor. The abutment 53 of course is so located that strip 48 engages pulley 52 whatever is the position of the latter on its path.

Motor 49 is fed by an electrical supply (not shown) through a control circuit adapted to stop the motor when the crank-shaft 58 is in either of two predetermined angular positions. One of these positions corresponds to the uppermost position of the support plate 42 (rest condition); the other corresponds to the lowermost position of the support plate (working condition). The uppermost position of the support disk may be adjusted by adjusting the position of a stop member 57 carried by strip 48. The lowermost position may be adjusted by screw 59 so that the samples confront the apertures 22 and 22' when in working condition.

The two stops are properly adjusted to limit the travel of the support plate 42 to less than it is limited by the rotation of the driving pulley 52. At both ends of the travel path of the support plate 42 the excess travel of the driving pulley 52 is taken up by the spring 54, by extension of the spring when inner tube 38 abuts against stop screw 59 and by contraction of the spring 54 when stop 57 abuts against stop plate 73. In this manner the two ends of travel of support plate 42 are easily adjusted independently in reproducible fashion. This arrangement has also the advantage of not requiring a precise stopping position of the driving pulley 52. It can be stopped at any rotational position within wide limits and accurate up or down positioning of support plate 42 will be realized: it is only required that the respective up or down stops be engaged. In addition, the sinusoidal motion of the support plate 42 provided by this arrangement affords very gentle starting and stopping of the support plate 42 and the sample 14 contributing to low maintenance and wear characteristics.

The driving motor 49 also actuates the shutter plate 28 through a transmission linkage. The motor drives a rotating cam 58 (FIG. 3) so that a complete revolution of the cam corresponds to a reciprocation of the support disk 42. An arm 62 securely fastened to the shaft 41 of the shutter plate 28 carries a roller 60 adapted to follow the edge of the cam. As shown on FIG. 3, the shutter plate 28 is biased towards the position in which it closes the tube 30 by a return spring 64 and is forced open against the action of spring 64 (FIGS. 1 and 3) when the roller confronts that portion of the cam of maximum radius. The shutter plate is closed by the action of spring 64 only and if a sample vial jams in tube 30 and remains in a location for which it intercepts the path of shutter plate 28 the shutter plate cannot be subjected to a force of such amplitude that it would either crush the sample vial or damage the shutter plate or driving motor. Operation: The operation of the changer which has been described may easily be understood from the above description and will only be referred to in its general lines. An operating sequence of the changer is initiated when a link of conveyor 12 exactly confronts the hole 16 and stops and when a sample 14 is present in the link.

Figure 4:
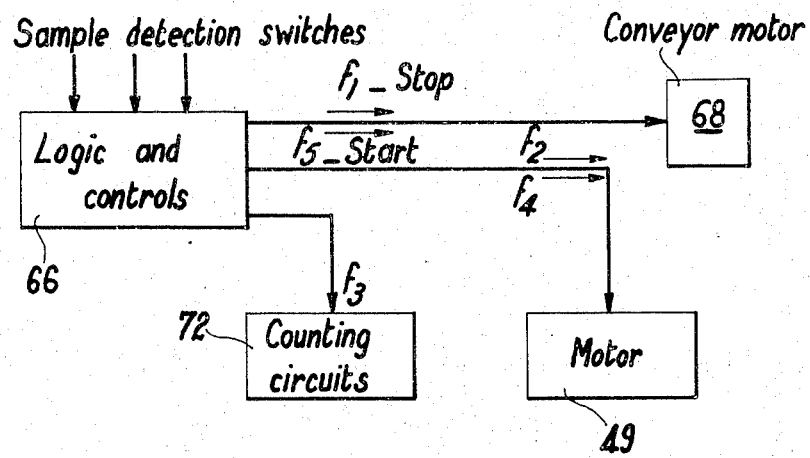
FIG. 4 is a simplified and schematic block diagram of the circuitry controlling operation of the sample changer.

The operating sequence may be triggered by means (not shown) which detect the link and the presence of a sample vial 14 in that link. Such detectors can be of conventional type and include micro-switches as described in French patent application n°PV 100. 705 already referred to; the micro-switches initiate a program which is recorded in a memory circuit 66 (FIG. 4).

In the initial condition, the components of the conveyor are as illustrated in FIG. 1. As a first step, the program causes a signal to be delivered which de-energizes the driving device 68 of the conveyor 12 (arrow $f_1$ on FIG. 4) and energizes the motor 49 of the sample changer (arrow $f_2$) in order to rotate the crankshaft 58 by a half turn in the direction of arrow $F_0$. During this half turn the support disk 42 moves down, comes into abutment with sleeve 34 and further moves down along with sleeve 34 until the sleeve abuts and the vial confronts the openings 20 and 20'. Before the support plate 42 has abutted against sleeve 34 and broken the light seal by separating tube 30 and sleeve 34 the cam 58 has rotated and cleared the path for the shutter plate 28 to close under the action of spring 64: the second light-tight seal provided by the shutter plate 28 and the flange of tube 30 closes before the first light-tight seal is opened. For this purpose, the cam should obviously have such a shape that the shutter plate 28 closes immediately after the vial of sample 14 has moved down sufficiently to clear the path of the shutter plate.

Detecting means, such as a micro-switch, is actuated by the sample or sleeve 44 when the latter is in working condition. Such means initiate the next step of the program and the logic circuits energize the counting circuits and ancillary devices (arrow $f_3$) for carrying out the necessary operations. Such operations may include three counts a first count for a time $t$ while the sample is exposed to a standard source of gamma rays:

a second count for the same time $t$ after the source has been removed;

a third count for a longer time, such count being corrected for quenching whose importance is determined from the difference between the first two counts.

After the sample has been counted, the logic circuit 66 energizes motor 49 again (arrow $f_4$ on FIG. 4) for rotating the crank-shaft 58 by an additional half turn in the same direction $F_0$. During this additional half turn the sleeve 34 moves up and sits on tube 30, (thereby shielding the photo-tubes 22 and 22' against light from the sample and from the outside), the shutter plate 28 rotates back to its rest position and clears the way for the sample vial 14, and the latter is lifted into the link of conveyor 12. A complete operating cycle has been achieved and the logic circuit energizes motor 68 (arrow $f_5$ on FIG. 4) for advance of the conveyor 12 by a step equal to the distance between two successive links.

The device which has been described above may include additional components. For instance a safety circuit may be provided for removing the risk of excessive exposure of the phototubes to day light if a sample jams in a position where it prevents the shutter plate 28 from closing. This safety circuit may consist of a threshold system which, if the phototubes receive an excessive amount of light, cuts off the high voltage supply to the phototubes and immediately energizes motor 49 (arrow on FIG. 4); rejection circuits may also be embodied for immediately moving back to the conveyor all samples which exhibit too low an activity and to bring the next sample to the working location: such devices have been embodied in existing spectrometers and are well known in the art to which the invention relates.

Figure 5:
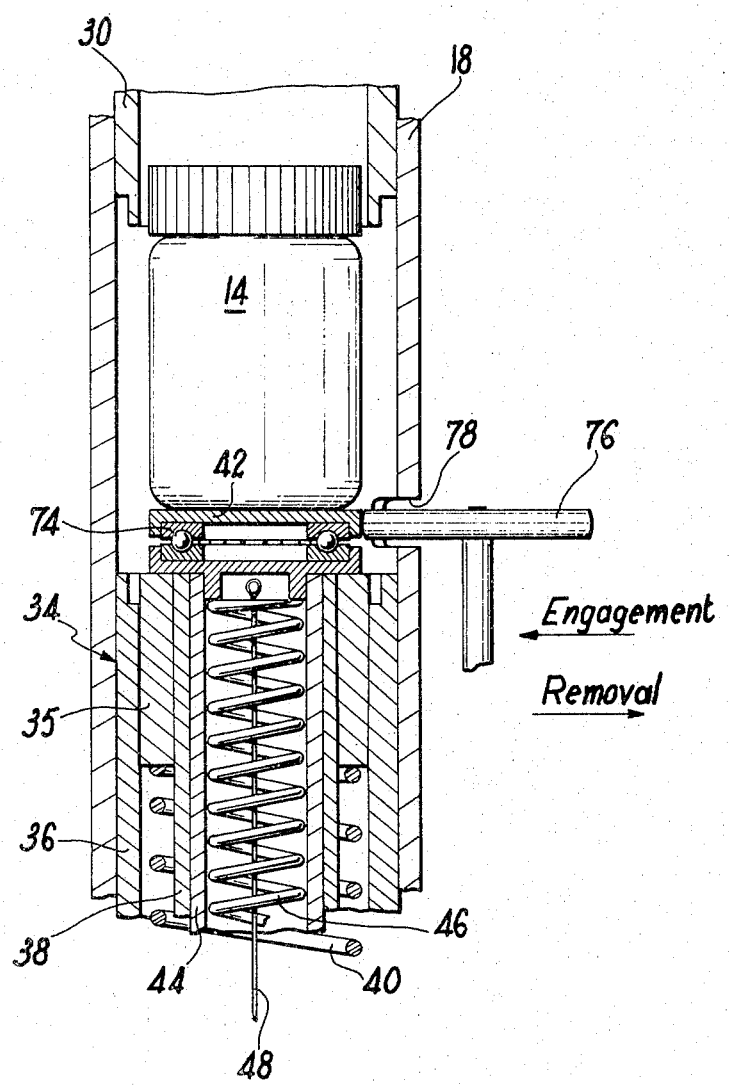
FIG. 5 is a partial view of a mechanism for rotating the samples during counting thereof.

Numerous modified embodiments may be used: for instance the support disk may be carried by tube 44 through a bearing 74 for rotation such an arrangement is illustrated on FIG. 5 which is a sectional view along a vertical plane perpendicular to the plane of FIG. 2, the parts being shown in the positions they assume in working condition. As disk 42 arrives to its working position, a wheel 76 driven in rotation by a motor (not shown) and located in a plane perpendicular to that of FIG. 1 and 2 is moved to such a location that it projects through a slot 78 of casing 18, frictionally engages the support disk 42 and rotates it. This arrangement is of advantage to increase the reproducibility when the sample is not homogeneous or the sample vial is not uniform in wall thickness or in some other way which makes for non-uniform light transmission. In addition such an arrangement reduces counting errors due to unavoidable irregularities in vial shape or in vial positioning which effectively alters the relationship between the vial and the two photomultipliers upon repetitive presentation of the vial into the counting chamber for measurement. It will of course be understood that the invention is not limited to the particular embodiments illustrated and described above and that many modifications may be made without departing from the invention and will be apparent to those skilled in the art.

We claim:

1. A liquid scintillation spectrometer comprising: a conveyor delivering successive samples one at a time to a first position and removing said samples from said position, a counting chamber under said first position, a stationary vertical tubular member defining a passage connecting said counting chamber and said first position, photomultiplier means measuring the light pulses in each of said samples when in said chamber, a tubular telescoping elevator piston vertically reciprocable in said passage moving said sample between said first position and said counting chamber, a first light shutter assembly located across said passage between said first position and said counting chamber, a second light shutter assembly located between said first shutter assembly and said chamber comprising a sleeve, cooperating abutment portions on the lower end of said tubular member and on the upper end of said sleeve vertically movable toward and away from said tubular member, abutment means on said piston engaging said sleeve and limiting the downward movement of said piston with respect to said sleeve, first resilient means raising said elevator piston upwardly toward said first position, second resilient means biasing said sleeve upwardly toward abutting position of said abutting portions, the biasing force of said second resilient means being greater than the compression force of said first resilient means, and motor means for positively moving said elevator piston downwardly against the action of said first resilient means, whereby upon continued action of said motor means after said tubular piston has abutted said sleeve, said piston and said sleeve move downwardly together, connecting means between said motor means and said elevator piston comprising a flexible member connected at one end to said piston and connected at its other end to a stationary member and an intermediate portion of said member guided by a pulley moved by said motor means along a circular path, adjustable stop means limiting said elevator piston in its upward travel comprising a first stopping member on said flexible member, a second adjustably fixed stopping member engaging said first stopping member, said connecting spring contracting to take up slack in said flexible member and an adjustable stop screw limiting said supporting means in its downward travel, said adjustable stop screw engaging said piston and said connecting spring extending to allow said movable pulley to continue in its path.

2. A liquid scintillation spectrometer according to claim 1, including means responsive to the delivery of a sample to said first position by said conveyor to actuate said motor and means for stopping said motor after said pulley has moved substantially through half its circular path.

3. A liquid scintillation spectrometer according to claim 2, including a shutter plate for said first shutter assembly, a vertical shaft supporting said plate and cam means driven by said motor rotating said plate on said shaft.

4. A liquid scintillation spectrometer according to claim 3, including roller means carried by said shaft and engaging said cam and spring means biasing said shutter plate toward closed position and biasing said roller means toward said cam.

5. A liquid scintillation spectrometer according to claim 4, said cam and said pulley having a relative angular position such that said shutter plate is moved by said spring means toward closed position immediately after said piston and a sample are out of the path of closing movement of said shutter plate.

6. A liquid scintillation spectrometer according to claim 1, said motor means rotates in one direction only.

7. A liquid scintillation spectrometer according to claim 1, including a platform on said piston to carry said samples, and means for rotating said platform and said sample when said sample is in operating position in said chamber.

8. A liquid scintillation spectrometer according to claim 1, said first resilient means being a helical spring acting on said sleeve and on said piston and biasing said sleeve and said piston out of abutment.

9. A liquid scintillation spectrometer comprising: a conveyor delivering successive samples one at a time to a first position, a counting chamber under said first position, a stationary vertical tubular member defining a passage connecting said counting chamber and said first position, photomultiplier means measuring the light pulses in a sample located in said chamber, a sleeve vertically movable toward and away from said tubular member, a tubular telescoping elevator piston vertically reciprocable in said passage supporting said sample, motor means moving said piston vertically between said first position and a lower position at which said sample is in said chamber, a first light shutter assembly comprising a plate movable transversely of the path of said sample between said first position and said counting chamber, driving means for moving said plate into and out of position closing said passage, a second light shutter assembly comprising cooperating portions on the lower end of said tubular member and on the upper portion of said sleeve, resilient means biasing said sleeve upwardly toward said tubular member for closure of said second shutter means, resilient means raising said piston toward said first position, means on said elevator piston for engaging said sleeve when said elevator piston has moved downward a predetermined amount with respect to said sleeve, and mechanical means interconnecting said driving means and said motor means for moving said plate into closing position immediately after said piston and said sample have moved from said first position out of the path of movement of said plate and prior to engagement of said piston and said sleeve, a flexible metal strip connected at one end to said piston and connected at its other end to a stop, a spring between said stop and said strip, a stationary pulley guiding said strip within said tubular member, a pulley movable along a circular path and engaging an intermediate portion of said strip between said stationary pulley and said stop, said motor means moving said pulley along said path, adjustable stop means limiting said elevator piston in its upward travel comprising a first stopping member on said flexible metal strip, a second adjustably fixed stopping member engaging said first stopping member, said connecting spring contracting to take up slack in said flexible metal strip and an adjustable stop screw limiting said supporting means in its downward travel, said adjustable stop screw engaging said piston and said connecting spring extending to allow said movable pulley to continue in its path.

10. A liquid scintillation spectrometer according to claim 9, including a rotatable platform on said elevator piston supporting said sample, and means for rotating said platform when said sample is in said counting chamber.

11. A liquid scintillation spectrometer according to claim 9, including a spring biasing said sleeve and said elevator piston out of abutment with each other against the action of said motor means.

12. An automatic sample changer moving each of successive samples from a rest position to a working position and back to said rest position, comprising:
a stationary tubular member defining a passage connecting said rest and said working positions;
tubular telescoping support means supporting said sample;
control means for vertically moving said support means in said passage between a first position in which said sample is in said rest position and a second position in which said sample is in said working position;
a first light shutter assembly including a plate movable transversely of the path of said sample between said rest position and said working position;
a second light shutter assembly including cooperating abutment portions forming a labyrinthine light seal on confronting ends of said tubular member and of a sleeve movable in said tubular member;
first resilient means acting on said support means and on said sleeve for raising said support means toward said first position, against the action of said control means;
second resilient means biasing said sleeve toward abutting position with said tubular member, the compression force of said second resilient means being greater than the force of said first resilient means;
abutment means on said support means limiting the downward movement of said support means with respect to said sleeve and limiting the compression of said first resilient means;
and mechanical means closing said plate immediately after said sample has moved down out of the path of movement of said plate and prior to separation of said tubular member and said sleeve, said control means including a flexible metal strip connected at one end to said piston and connected at its other end to a stop, a spring between said stop and said strip, a stationary pulley guiding said strip in said tubular member, a pulley movable along a circular path and engaging an intermediate portion of said strip between said stationary pulley and said stop, unidirectional means for moving said pulley along said path, adjustable stop means limiting said elevator piston in its upward travel comprising a first stopping member on said flexible metal strip, a second adjustably fixed stopping member engaging said first stopping member, said connecting spring extending to allow said movable pulley to continue in its path.

13. An automatic sample changer according to claim 12, said support means being rotatable at least in said working position and driving means for rotating said support means in said working position.

* * * * *